United States Patent
Leroy et al.

(10) Patent No.: US 11,784,559 B2
(45) Date of Patent: Oct. 10, 2023

(54) DC/DC CONVERTER OVERLOAD MANAGEMENT IN VEHICLE ELECTRICAL SYSTEMS

(71) Applicant: VOLVO TRUCK CORPORATION, Gothenburg (SE)

(72) Inventors: Frederic Leroy, Lyons (FR); David De Brito, Charvieu Chavagneux (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 402 days.

(21) Appl. No.: 16/973,943

(22) PCT Filed: Jun. 11, 2018

(86) PCT No.: PCT/EP2018/065340
§ 371 (c)(1),
(2) Date: Dec. 10, 2020

(87) PCT Pub. No.: WO2019/238203
PCT Pub. Date: Dec. 19, 2019

(65) Prior Publication Data
US 2021/0249949 A1 Aug. 12, 2021

(51) Int. Cl.
*H02M 1/40* (2007.01)
*H02M 1/00* (2006.01)
(Continued)

(52) U.S. Cl.
CPC ............ *H02M 1/40* (2013.01); *B60R 16/033* (2013.01); *H02J 1/102* (2013.01); *H02J 1/14* (2013.01);
(Continued)

(58) Field of Classification Search
CPC .......... H02M 1/40; H02M 1/0009; H02J 1/14
See application file for complete search history.

(56) References Cited

U.S. PATENT DOCUMENTS

2010/0236851 A1* 9/2010 Van Maanen ......... B60L 3/0046
180/65.265
2011/0233995 A1* 9/2011 Nordstrom .............. B60R 16/03
307/9.1
(Continued)

FOREIGN PATENT DOCUMENTS

WO 2016178054 A1 11/2016

OTHER PUBLICATIONS

International Search Report and Written Opinion dated Jul. 19, 2018 in corresponding International PCT Application No. PCT/EP2018/065340, 9 pages.

*Primary Examiner* — Adolf D Berhane
*Assistant Examiner* — Afework S Demisse
(74) *Attorney, Agent, or Firm* — Venable LLP; Jeffri A. Kaminski (57) ABSTRACT

A method of operating an electrical system including an electrical power source configured to supply a first DC voltage at a first voltage level and a DC/DC converter coupled to the electrical power source and configured to supply a second DC voltage is provided. The method includes monitoring a level of current supplied by the DC/DC converter, determining, based on monitoring of the level of the current, that the DC/DC converter is saturated, and in response to determining that the DC/DC converter is saturated, regulating a level of voltage outputby the DC/DC converter. Related DC/DC converters and vehicle electrical systems are disclosed.

20 Claims, 7 Drawing Sheets

(51) Int. Cl.
*B60R 16/033* (2006.01)
*H02J 1/10* (2006.01)
*H02J 1/14* (2006.01)

(52) U.S. Cl.
CPC ....... *H02M 1/0009* (2021.05); *H02J 2310/46* (2020.01)

(56) References Cited

U.S. PATENT DOCUMENTS

| | | |
|---|---|---|
| 2011/0298624 A1 | 12/2011 | Bauman et al. |
| 2015/0256094 A1* | 9/2015 | Chaudhuri .......... H02M 7/7575 363/35 |
| 2018/0029474 A1 | 2/2018 | Berels et al. |

* cited by examiner

DC/DC CONVERTER OVERLOAD MANAGEMENT IN VEHICLE ELECTRICAL SYSTEMS

CROSS-REFERENCE TO RELATED APPLICATIONS

This application is a U.S. National Stage application of PCT/EP2018/065340, filed Jun. 11, 2018, and published on Dec. 12, 2019, as WO 2019/238203 A1, all of which is hereby incorporated by reference in its entirety.

FIELD

The inventive concepts relate to vehicle electrical systems, and in particular to dual voltage battery systems for vehicles.

BACKGROUND

Figure 1:
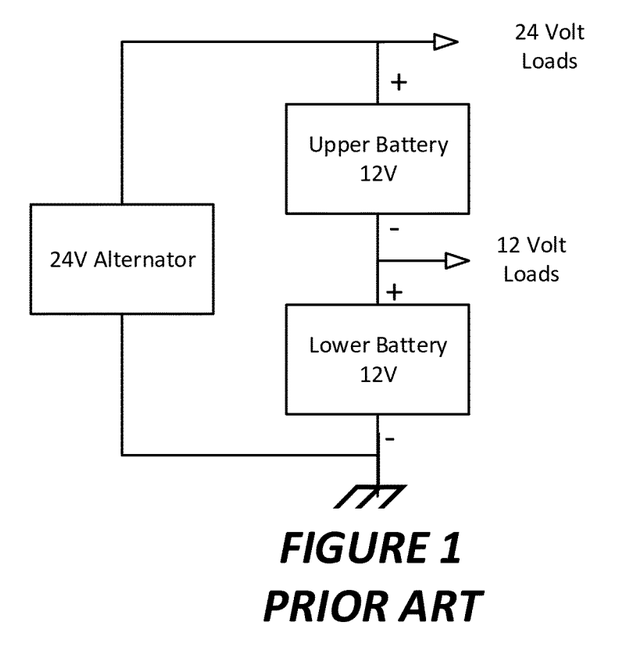
FIG. 1 is a block diagram illustrating a conventional dual voltage vehicle electrical system.

Some vehicles, including heavy construction vehicles, buses and trucks, may include multi-voltage electrical systems capable of supplying current at different voltage levels. For example, a dual voltage electrical system in a vehicle may supply current at both 24 volts (24V) and 12 volts (12V) for powering various loads in the vehicle. A dual voltage vehicle electrical system is illustrated in FIG. 1. As shown therein, the electrical system includes first and second 12-volt (12V) batteries, namely, a lower battery and an upper battery, arranged in series to provide a total of 24 volts for powering 24V loads. While the engine of the vehicle is running, the batteries may be charged by a 24-volt alternator connected in parallel with the batteries.

In the system illustrated in FIG. 1, 24 volts are supplied at a positive terminal of the upper battery, while 12 volts are supplied at a positive terminal of the lower battery. However, it is also possible to supply power to 12-volt loads using a DC/DC step-down converter that is powered by 24 volts supplied by the upper battery and/or a 24-volt alternator.

SUMMARY

A method of operating an electrical system including an electrical power source configured to supply a first DC voltage at a first voltage level and a DC/DC converter coupled to the electrical power source and configured to supply a second DC voltage at a second voltage level that is different from the first voltage level is provided according to some embodiments. The method includes monitoring a level of current supplied by the DC/DC converter, determining, based on monitoring of the level of the current, that the DC/DC converter is saturated, and in response to determining that the DC/DC converter is saturated, regulating a level of voltage output by the DC/DC converter.

According to further embodiments, a method of operating a DC/DC converter including a plurality of output lines coupled to respective load circuits, each of the plurality of output lines having a respective priority level is provided. The method includes receiving a cut-off request from an electrical control unit, selecting one of the plurality of output lines having a lowest priority among the plurality of output lines, and disabling the selected one of the plurality of output lines.

Further embodiments provide a method of operating a DC/DC converter including a plurality of output lines coupled to respective load circuits, each of the plurality of output lines having a respective priority level. The method includes receiving a cut-off request from an electrical control unit, the cut-off request includes a request level, selecting one of the plurality of output lines, determining if a priority level associated with the selected one of the plurality of output lines units is less than the request level, and in response to determining that the priority level associated with the selected one of the plurality of output lines is less than the request level, disabling the selected one of the plurality of output lines.

A vehicle electrical system according to some embodiments includes a DC voltage source configured to supply a first output voltage having a first output voltage level, a DC/DC converter coupled to the DC voltage source and configured to supply a first output voltage having a second output voltage level that is different from the first output voltage level, an electrical control unit coupled to the DC/DC converter and including a microcontroller programmed to perform operations including monitoring a level of current supplied by the DC/DC converter, determining, based on monitoring of the level of the current, that the DC/DC converter is saturated, and in response to determining that the DC/DC converter is saturated, regulating a level of voltage output by the DC/DC converter.

A DC/DC converter for a vehicle electrical system according to some embodiments includes a controller, and a plurality of output lines coupled to the controller and configured to supply an output voltage to a respective one of a plurality of load circuits. The controller is configured to receive a cut-off request from an electrical control unit, select one of the plurality of output lines having a lowest priority among the plurality of current and voltage adjustment units in response to the cut-off request, and disable the selected one of the plurality of output lines.

A DC/DC converter for a vehicle electrical system according to some embodiments includes a controller and a plurality of output lines coupled to the controller and configured to supply an output voltage to a respective one of a plurality of load circuits. The controller is configured to receive a cut-off request from an electrical control unit, the cut-off request including a request level, select one of the plurality of output lines, determine if a priority level associated with the selected one of the plurality of output lines is less than the request level, and in response to determining that the priority level associated with the selected one of the plurality of output lines is less than the request level, disable the selected one of the plurality of output lines.

Other systems/methods for operating a vehicle electrical system will be or become apparent to one with skill in the art upon review of the following drawings and shall be included within this description and protected by the accompanying claims. Moreover, it is intended that all embodiments disclosed herein can be implemented separately or combined in any way and/or combination unless expressly excluded.

Aspects

According to one aspect, a method of operating an electrical system including an electrical power source configured to supply a first DC voltage at a first voltage level and a DC/DC converter coupled to the electrical power source and configured to supply a second DC voltage at a second voltage level that is different from the first voltage level is provided. The method includes monitoring a level of current supplied by the DC/DC converter, determining, based on monitoring of the level of the current, that the DC/DC converter is saturated, and in response to determining that the DC/DC converter is saturated, regulating a level of voltage output by the DC/DC converter.

According to one aspect, regulating the level of voltage output by the DC/DC converter includes increasing a level of voltage output by the DC/DC converter to reduce a draw of current output by the DC/DC converter by a load connected to the DC/DC converter.

According to an aspect, monitoring the level of current supplied by the DC/DC converter includes receiving a data signal from the DC/DC converter indicating the level of current supplied by the DC/DC converter.

According to an aspect, the data signal includes a load percent indicator that indicates a percentage of power supplied by the DC/DC converter relative to a maximum power level.

According to an aspect, the data signal is provided via a Controller Area Network, CAN, or Local Interconnect Network, LIN, data bus.

According to an aspect, the DC/DC converter is configured to supply electrical power to a plurality of independent electrical loads, and regulating the level of voltage output by the DC/DC converter includes selectively regulating the level of voltage output by the DC/DC converter to the plurality of independent electrical loads.

According to an aspect, regulating the level of voltage output by the DC/DC converter includes selectively disabling power supplied to one of the plurality of independent electrical loads.

According to an aspect, the method may further include selectively regulating a level of current output by the DC/DC converter one of the plurality of independent electrical loads in response to determining that the DC/DC converter is saturated.

According to an aspect, the vehicle electrical system includes a battery source, and the method may further include measuring a state of charge on the battery source, wherein selectively disabling one of the plurality of independent electrical loads is performed based on the state of charge of the battery source.

According to an aspect, each of the plurality of independent electrical loads has an assigned priority level, and selectively disabling one of the plurality of independent electrical loads is additionally performed based on a priority level assigned to the one of the plurality of independent electrical loads.

According to an aspect, selectively regulating the level of voltage output by the DC/DC converter to the plurality of independent electrical loads includes balancing a level of power output to each of the plurality of independent electrical loads.

According to an aspect, regulating the level of voltage output by the DC/DC converter includes transmitting a cut-off request to the DC/DC converter.

According to an aspect, the cut-off request includes a priority level.

According to an aspect, the priority level is based on at least one of a state of charge, SOC, of a battery coupled to the DC/DC converter, a load function of a load that is being cut off and/or a severity of an overcurrent condition of the DC/DC converter.

According to an aspect, a method of operating a DC/DC converter including a plurality of output lines coupled to respective load circuits, each of the plurality of output lines having a respective priority level is provided. The method includes receiving a cut-off request from an electrical control unit, selecting one of the plurality of output lines having a lowest priority among the plurality of output lines, and disabling the selected one of the plurality of output lines.

According to an aspect, the DC/DC converter includes a plurality of current and voltage adjustment units that generate a DC output voltage in response to a DC input voltage coupled to respective ones of the load circuits through respective ones of the plurality of output lines, disabling the selected one of the plurality of output lines includes disabling the current and voltage adjustment unit coupled to the selected one of the plurality of output lines.

According to an aspect, the DC/DC converter includes a voltage conversion unit that generate a DC output voltage in response to a DC input voltage and a plurality of switches, the voltage conversion unit is coupled to the plurality of output lines through respective ones of the plurality of switches, disabling the selected one of the plurality of output lines includes disconnecting the selected one of the plurality of output lines via the respective one of the plurality of switches coupled to the selected one of the plurality of output lines.

According to an aspect, a method of operating a DC/DC converter including a plurality of output lines coupled to respective load circuits, each of the plurality of output lines having a respective priority level, is provided. The method includes receiving a cut-off request from an electrical control unit, the cut-off request includes a request level, selecting one of the plurality of output lines, determining if a priority level associated with the selected one of the plurality of output lines units is less than the request level, and in response to determining that the priority level associated with the selected one of the plurality of output lines is less than the request level, disabling the selected one of the plurality of output lines.

According to an aspect, the method further includes, after determining if a priority level associated with the selected one of the plurality of output lines is less than the request level, selecting a next one of the plurality of output lines, determining if a priority level associated with the selected next one of the plurality of output lines is less than the request level, and in response to determining that the priority level associated with the selected next one of the plurality of output lines is less than the request level, disabling the selected next one of the plurality of output lines.

According to an aspect, the method further includes, in response to receiving the cut-off request, attempting to reduce a level of current output by the DC/DC converter without disabling any of the output lines.

According to an aspect, the DC/DC converter includes a plurality of current and voltage adjustment units that generate a DC output voltage in response to a DC input voltage coupled to respective ones of the load circuits through respective ones of the plurality of output lines, and disabling the selected one of the plurality of output lines includes disabling the current and voltage adjustment unit coupled to the selected one of the plurality of output lines.

According to an aspect, the DC/DC converter includes a voltage conversion unit that generate a DC output voltage in response to a DC input voltage and a plurality of switches, the voltage conversion unit is coupled to the plurality of output lines through respective ones of the plurality of switches, and disabling the selected one of the plurality of output lines includes disconnecting the selected one of the plurality of output lines via the respective one of the plurality of switches coupled to the selected one of the plurality of output lines.

A vehicle electrical system according to an aspect includes a DC voltage source configured to supply a first output voltage having a first output voltage level, a DC/DC converter coupled to the DC voltage source and configured to supply a first output voltage having a second output voltage level that is different from the first output voltage level, an electrical control unit coupled to the DC/DC converter and including a microcontroller programmed to perform operations including monitoring a level of current supplied by the DC/DC converter, determining, based on monitoring of the level of the current, that the DC/DC converter is saturated, and in response to determining that the DC/DC converter is saturated, regulating a level of voltage output by the DC/DC converter.

A DC/DC converter for a vehicle electrical system according to an aspect includes a controller, and a plurality of output lines coupled to the controller and configured to supply an output voltage to a respective one of a plurality of load circuits. The controller is configured to receive a cut-off request from an electrical control unit, select one of the plurality of output lines having a lowest priority among the plurality of current and voltage adjustment units, and disable the selected one of the plurality of output lines.

A DC/DC converter for a vehicle electrical system according to an aspect includes a controller, and a plurality of output lines coupled to the controller and configured to supply an output voltage to a respective one of a plurality of load circuits. The controller is configured to receive a cut-off request from an electrical control unit, the cut-off request includes a request level, select one of the plurality of output lines, determine if a priority level associated with the selected one of the plurality of output lines is less than the request level, and in response to determining that the priority level associated with the selected one of the plurality of output lines is less than the request level, disable the selected one of the plurality of output lines.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a block diagram of a vehicle electrical system according to some embodiments of the inventive concepts.

DETAILED DESCRIPTION OF EMBODIMENTS

Some dual-voltage vehicle electrical systems supply current to 12-volt loads using a DC/DC step-down voltage converter, or more simply a DC/DC converter, that is powered by 24 volts supplied by a 24-volt electrical system, such as a 24-volt battery and/or a 24-volt alternator.

Although DC/DC converters are useful for providing DC voltage at a different voltage level than the nominal voltage level of the vehicle electrical system, situations may arise in which a high demand for 12-volt current causes the DC/DC converter to saturate. When the DC/DC converter saturates, it may not be able to supply a sufficient level of current to one or more loads and/or may cause the DC/DC converter to shut down entirely due to an overcurrent condition.

Some embodiments address one or more of these issues by providing a vehicle electrical system that monitors output current supplied by a DC/DC converter in a multi-voltage battery system to reduce/avoid saturation of the DC/DC converter. In one aspect, the vehicle electrical system monitors the DC/DC converter and determines that the output current supplied by the DC/DC converter is saturated or nearly saturated, and takes a remedial action to reduce a level of current that is supplied by the DC/DC converter to thereby alleviate the saturation condition and/or avoid an overcurrent condition. The actions that may be taken in response to determining that the current supplied by the DC/DC converter is saturated or nearly saturated may include, for example, increasing a voltage level output by the DC/DC converter. Other actions that may be taken include alerting a user of the vehicle to reduce 12V loads, automatically disabling non-critical 12V loads, such as non-safety related 12V loads, etc.

As used herein, "saturation" refers to the condition in which a DC/DC converter is delivering an output current that is at or near its maximum rated output current. When the DC/DC converter is saturated, then the DC/DC converter may not be able to deliver sufficient current to meet the needs of the system, and may result in overheating and/or damage to the electrical components of the converter. In some cases, a DC/DC converter may be determined to be saturated when the DC/DC converter is delivering 95% of its maximum rated output current. In some cases, a DC/DC converter may be determined to be saturated when the DC/DC converter is delivering 98% of its maximum rated output current. In some cases, a DC/DC converter may be determined to be saturated when the DC/DC converter is delivering 99% or more of its maximum rated output current. "Overcurrent" refers to the situation in which the output current of a DC/DC converter exceeds its maximum rated output current.

Figure 2:
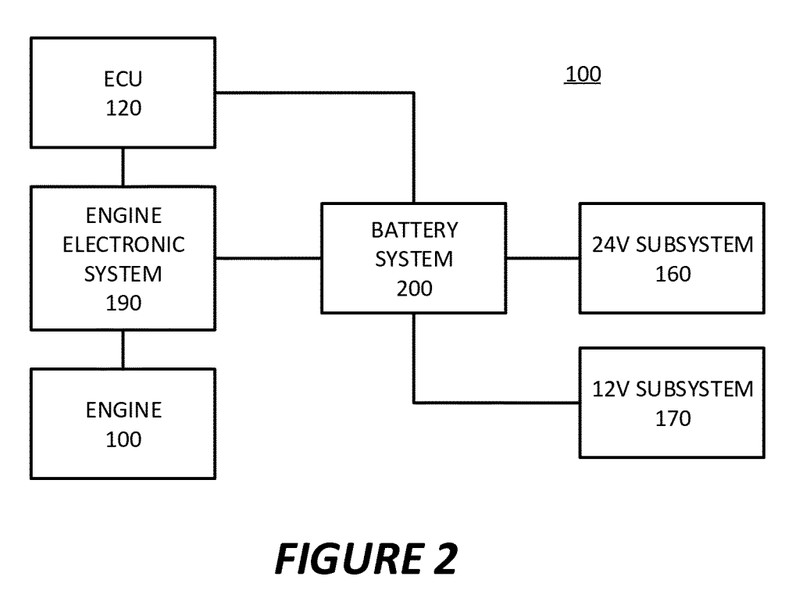
FIG. 2 is a block diagram of a dual voltage vehicle electrical system according to some embodiments of the inventive concepts.

Reference is made to FIG. 2, which is a block diagram of a dual-voltage vehicle electrical system 100 in which embodiments of the inventive concepts may be employed. Although the electrical system 100 is a dual voltage electrical system, it will be appreciated that the embodiments disclosed herein can be implemented in an electrical system capable of supplying more than two voltages.

The vehicle electrical system 100 generally includes an engine electronic system 190 coupled to an engine 100 and a battery system 200. The battery system 200 powers a 24V subsystem 160 including one or more 24V loads and a 12V subsystem 170 including one or more 12V loads. One or more electronic control units (ECU), such as, for example ECU 120, monitors and controls the operation of the engine electronic system 190 and the battery system 200.

Figure 3:
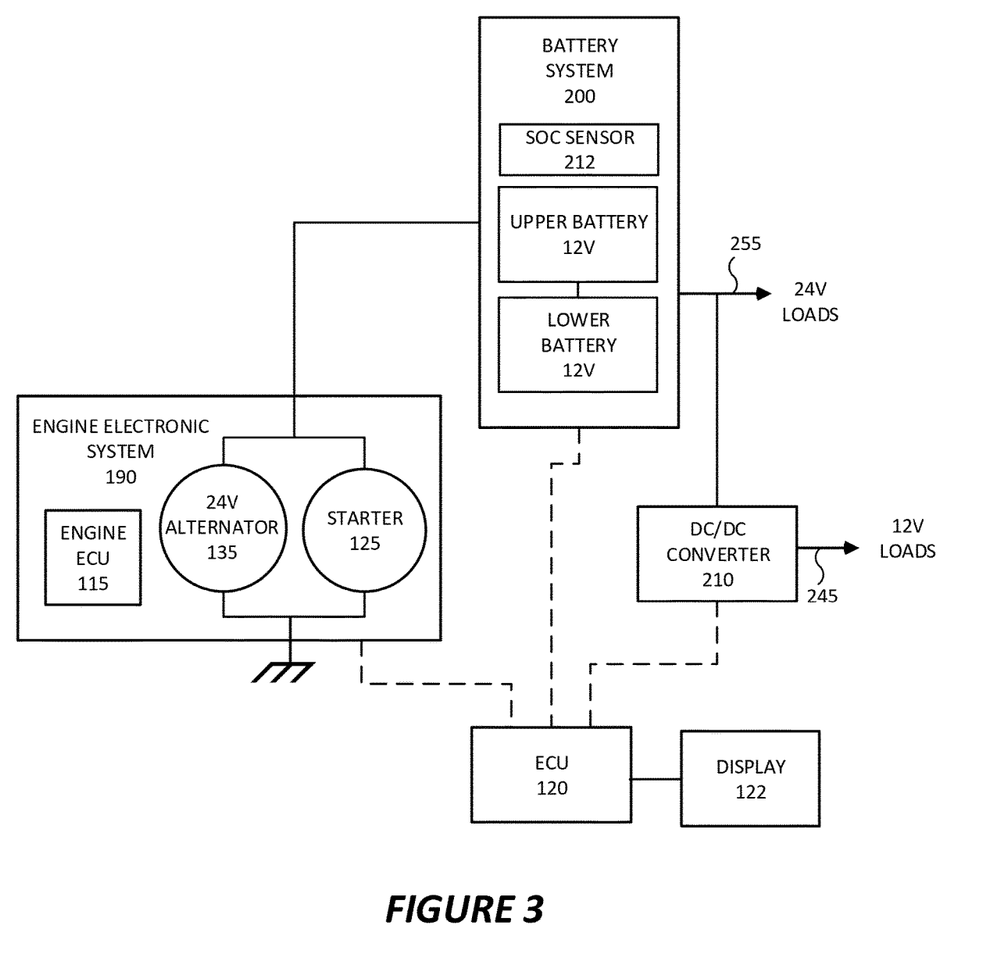
FIG. 3 is a block diagram illustrating various components of a dual voltage battery subsystem of a vehicle electrical system according to some embodiments of the inventive concepts in more detail.

FIG. 3 is a block diagram illustrating certain components of the vehicle electrical system 100 in greater detail. As shown therein, the engine electronic system 190 includes an engine ECU 115, a 24V alternator 135 and a starter 125. As shown, an electrical control unit (ECU) 120 and/or the ECU 115 controls operation of the 24V alternator 135 and the starter 125. For example, the ECU 115/120 may adjust the voltage regulation of the starter 135, control timing of the ignition signal, etc. The engine ECU 115 may be provided separately from or integrated with the ECU 120, and may perform some of the functions described herein. The alternator 135 and the starter 125 may be coupled to and controlled by signals from the ECU 115/120. A display 122 is coupled to the ECU 120 and provides information to an operator of the vehicle.

Still referring to FIG. 3, the battery system 200 is configured to supply power at 24 volts. The battery system 200 may include a first (lower) battery and a second (upper) battery connected in series to supply a 24-volt current on a 24-volt output line 255. In some embodiments, a single 24-volt battery may be provided. In other embodiments, more batteries may be provided in parallel and/or series configuration. The battery system 200 may include a state of charge (SOC) sensor that measures a state of charge of the upper and/or lower battery and/or the entire battery system, and reports the SOC to the ECU 120. A DC/DC converter 210 receives 24 volts from the battery system 200 and converts from 24 volts to 12 volts for supplying power to 12 volt loads on as 12-volt output line 245.

The ECU 120 monitors and controls operations of the engine electronic system 190, the battery system 200 and the DC/DC converter 210. For example, the ECU 120 may monitor current and/or voltage output by the alternator 135 and/or the starter 125 and/or may monitor other parameters, such as temperature of the alternator 135 and/or the starter 125. The ECU 120 may monitor current and/or voltage input to or output by the battery system 200 and/or may monitor other parameters, such as temperature and/or state of charge (SOC) of the battery system 200. Likewise, the ECU 120 may monitor current and/or voltage input to or output by the DC/DC converter 210 and/or may monitor other parameters, such as temperature of the DC/DC converter 210. Information relating to the operation of one or more components of the electrical system may be displayed by the ECU 120 to an operator using the display 122.

Figure 4:
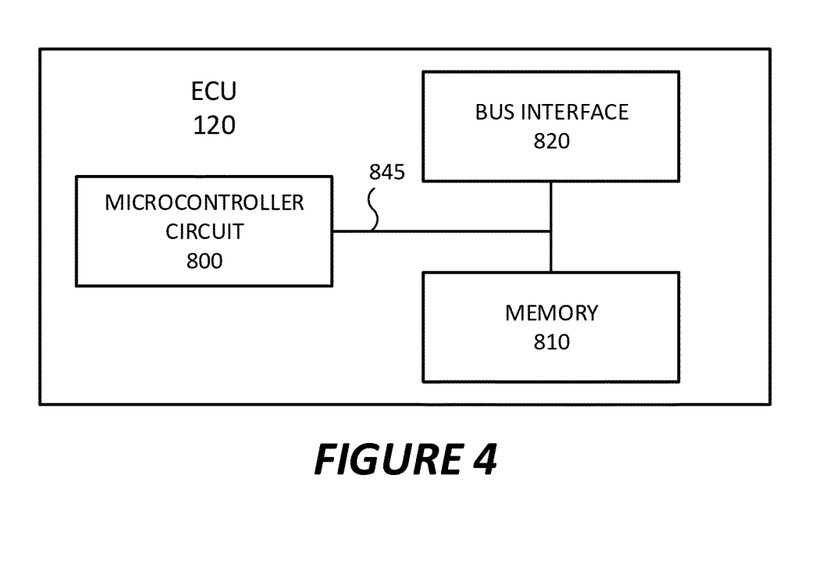
FIG. 4 is a block diagram of a electronic control unit according to some embodiments.

FIG. 4 is a block diagram of an electrical control unit 120 according to some embodiments. As shown in FIG. 4, the ECU 120 includes a microcontroller circuit 800. The ECU 220 includes a memory 810 and a bus interface 820 connected to the microcontroller circuit 800, for example, through a system bus 845. The microcontroller circuit 800 may be any suitable programmable controller, such as a 16-bit or 32-bit PIC microcontroller manufactured by Microchip Technology Inc. of Chandler Ariz. that is capable of performing operations described above, such as monitoring a level of the equalizing current, determining that the converter current is saturated, etc. The bus interface 820 may be a serial communication chip, such as a UART chip that enables serial communication with the DC/DC converter 210 and/or other parts of the vehicle electrical system 100. The memory 810 may be separate from the microcontroller circuit 800 or included on-board the microcontroller circuit, and may include random access memory (RAM), read-only memory (ROM), flash memory, cache memory, or any other type of memory that stores instructions and/or data for use by the microcontroller circuit 800. The memory 810 may contain functional modules of instructions that configure the ECU 120 to perform the operations described herein.

Figure 5A:
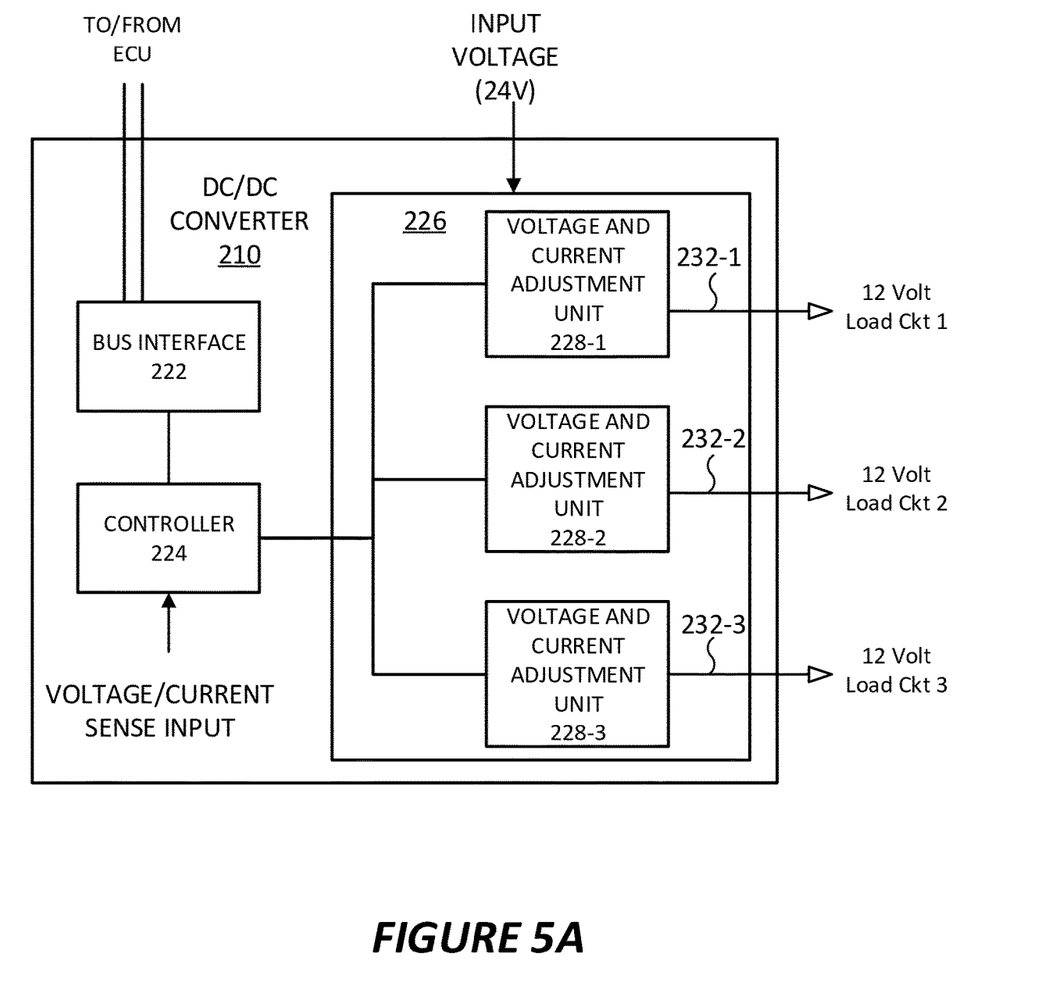
FIG. 5A is a block diagram of a DC/DC converter according to some embodiments.

FIG. 5A is a block diagram illustrating aspects of a DC/DC converter according to some embodiments. As shown therein, a DC/DC converter 210 includes a controller 224 that communicates with the ECU 120 through a bus interface 222. The controller 224 may include a microcontroller circuit as described above with reference to the ECU 120. The DC/DC converter 210 also includes a voltage conversion unit 226 that receives an input DC voltage signal, such as a 24-volt input voltage signal, and converts the input voltage to one or more output voltage signals, such as a 12-volt output voltage signal.

Figure 6:
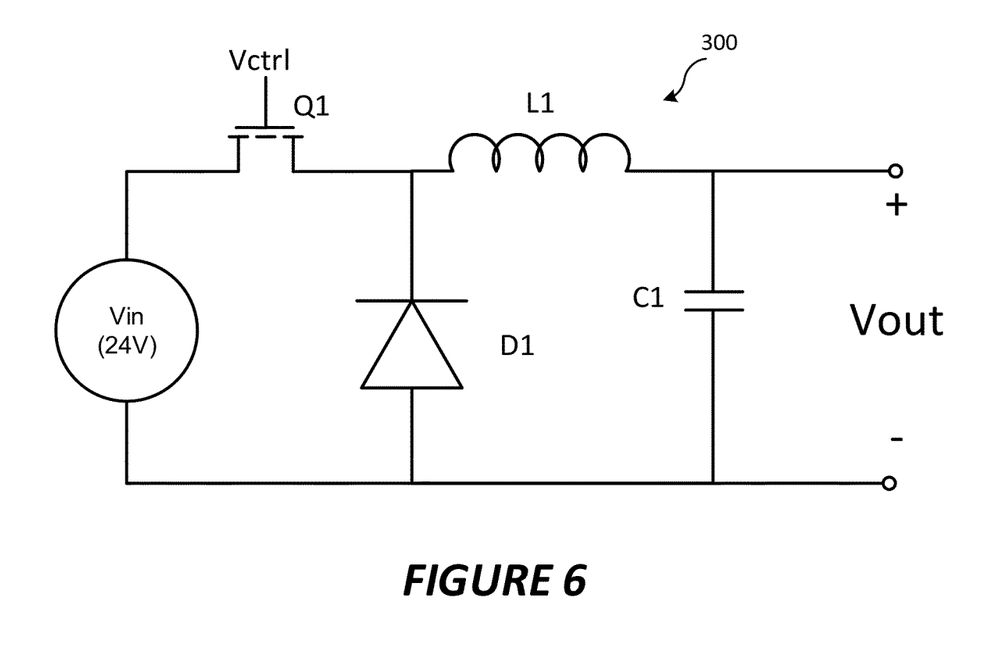
FIG. 6 is a block diagram of a buck voltage converter that may be used in a DC/DC converter according to some embodiments.

The voltage conversion unit 226 may include one or more DC-DC voltage conversion circuits, which may, for example, be implemented using buck converter circuits for step-down voltage conversion. Brief reference is made to FIG. 6, which schematically illustrates a buck converter circuit 300 that may be provided in a voltage conversion unit 226. The buck converter circuit includes a diode D1, an inductor L1, an output capacitor C1, and a transistor switch Q1. An input voltage Vin is selectively coupled to the cathode of the diode D1 by operation of the switch Q1. The state of the switch Q1 is controlled by a control signal Vctrl which may be generated, for example, by the controller 224 of the DC/DC converter 210. An output voltage Vout is generated across the output capacitor C1. A level of the output voltage Vout is determined by a level of the input voltage Vin, a switching frequency of the control signal Vctrl applied to the switch Q1, the inductance of the inductor L1 and the capacitance of the capacitor C1. Through appropriate selection of circuit component values and switching frequency, the controller 224 may control a level of the output voltage Vout supplied by the converter circuit 300. The design of step-down DC/DC voltage converters is well known to those skilled in the art and need not be described further.

Returning again to FIG. 5A, the voltage conversion unit 226 may include a plurality of voltage and current adjustment units 228, each of which may include a DC-DC voltage conversion circuit 300 and which may supply power to a separate 12-volt load circuit via respective output lines 232-1, 232-2, 232-3. Each of the voltage and current adjustment units 228 may be controlled independently by the controller 224 based on voltage and/or current sense inputs that sense a level of voltage and/or current supplied by the respective voltage and current adjustment units 228. Thus, for example, the controller 224 may selectively increase or decrease a level of voltage output by one of the voltage and current adjustment units 228 independent of the other voltage and current adjustment units 228. In the example illustrated in FIG. 5A, the DC/DC converter 210 includes three separate voltage and current adjustment units 228-1, 228-2 and 228-3 configured to supply 12-volt power to three separate 12-volt load circuits. However, it will be appreciated that this number is provided as an example only, and that more or fewer voltage and current adjustment units 228 may be provided.

The DC/DC converter 210 may provide information to the ECU 120 via the bus interface 222 regarding the state of the DC/DC converter, including the state of the current adjustment units 228. For example, the DC/DC converter 210 may provide information to the ECU 120 regarding the level of current and/or voltage supplied by respective ones of the voltage and current adjustment units 228 at any given time. Information may be communicated between the DC/DC converter 210 and the ECU 120 using the Controller Area Network (CAN) or Local Interconnect Network (LIN) protocols, which are well known in the art.

By monitoring a level of current output by the voltage and current adjustment units 228 via messages provided by the controller 224, the ECU can determine if the DC/DC converter circuits in such units are at or approaching saturation.

Figure 5B:
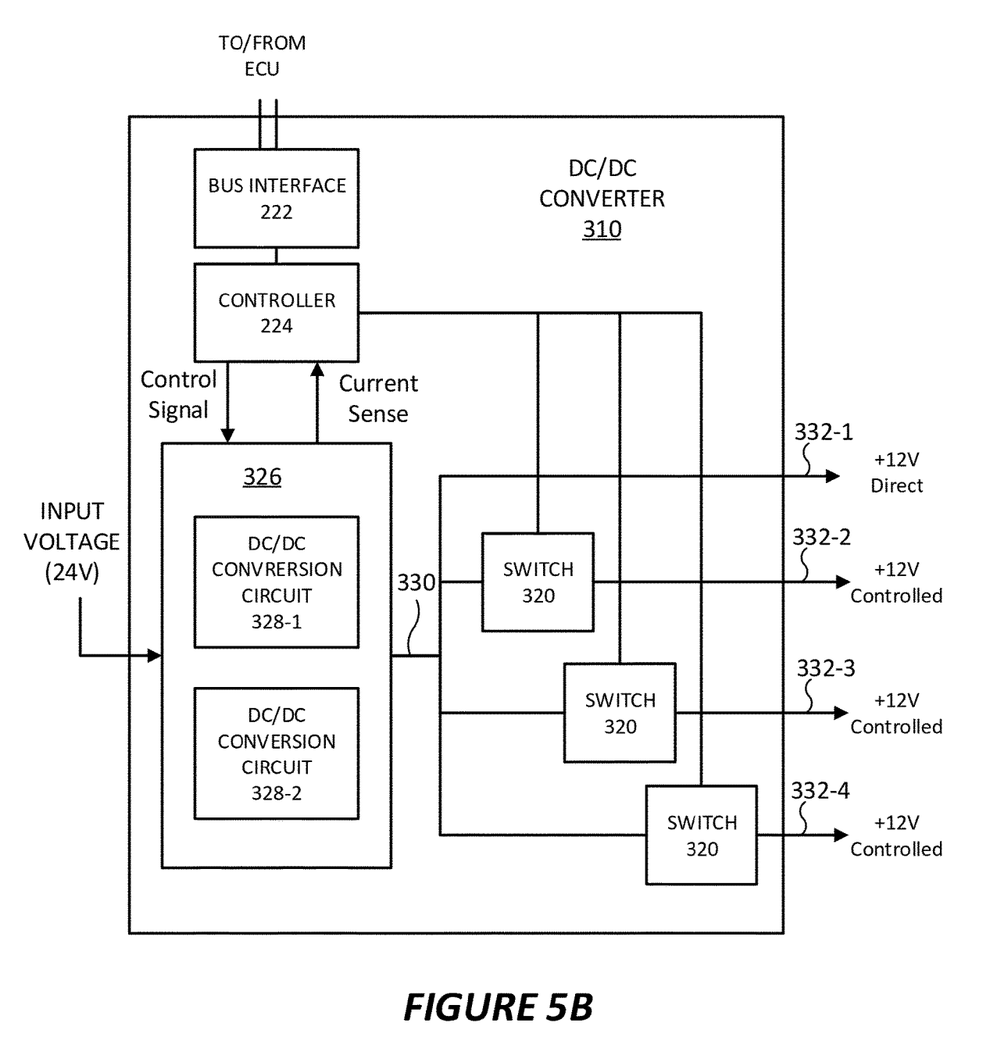
FIG. 5B is a block diagram of a DC/DC converter according to further embodiments.

FIG. 5B is a block diagram illustrating aspects of a DC/DC converter 310 according to further embodiments. As shown therein, a DC/DC converter 310 includes a controller 224 that communicates with the ECU 120 through a bus interface 222. The DC/DC converter 310 also includes a voltage conversion unit 326 that receives an input DC voltage signal, such as a 24-volt input voltage signal, and converts the input voltage to one or more output voltage signals, such as a 12-volt output voltage signal.

The voltage conversion unit 326 may include one or more DC-DC voltage conversion circuits 328, which may, for example, be implemented using buck converter circuits for step-down voltage conversion as described above. The voltage conversion unit may output an output voltage, such as a 12-volt output voltage, on an output line 330 in response to a control signal provided by the controller 224. The voltage conversion unit 326 may provide a current sense signal to the controller 224 indicative of a level of current output by the voltage conversion unit 326. The voltage output by the voltage conversion unit 326 on the output line 330 may be fed to one or more output lines 332 including a direct (unswitched) output line 332-1 and one or more switched output lines 332-2, 332-3, 332-4. The outputs of the switched output lines 332-2, 332-3, 332-4 are controlled by the controller 224 via switches 320, which may be voltage controlled MOSFET switches in some embodiments. Based on the output current level, the controller 224 can selectively switch off one or more of the switched output lines 332-2, 332-3, 332-4 to reduce the possibility of current saturation.

In the example illustrated in FIG. 5B, the DC/DC converter 310 includes three separate switched output lines 332-2, 332-3, 332-4 configured to supply 12-volt power to three separate 12-volt load circuits. However, it will be appreciated that this number is provided as an example only, and that more or fewer switched output lines may be provided.

In some embodiments, upon detecting that the DC/DC converter 210 is at or near saturation, the ECU 120 may cause the DC/DC converter 210 to increase converter voltage regulation. For example, the ECU 120 may send a message instructing the DC/DC converter 210 to increase the output voltage from 12V to a higher voltage. Increasing the output voltage may decrease the current draw, which may reduce or limit saturation of the converter and avoid an overcurrent condition. In particular, some loads in the vehicle electrical system, such as heaters, fans, portable electronic chargers, etc., may react to an increased input voltage by reducing their current draw. When such loads are present on a 12-volt load circuit of a vehicle electrical system, increasing the voltage output by the DC/DC converter 210 may result in decreased current draw from the DC/DC converter 210, which may help to avoid saturation of the DC/DC converter 210.

Figure 7:
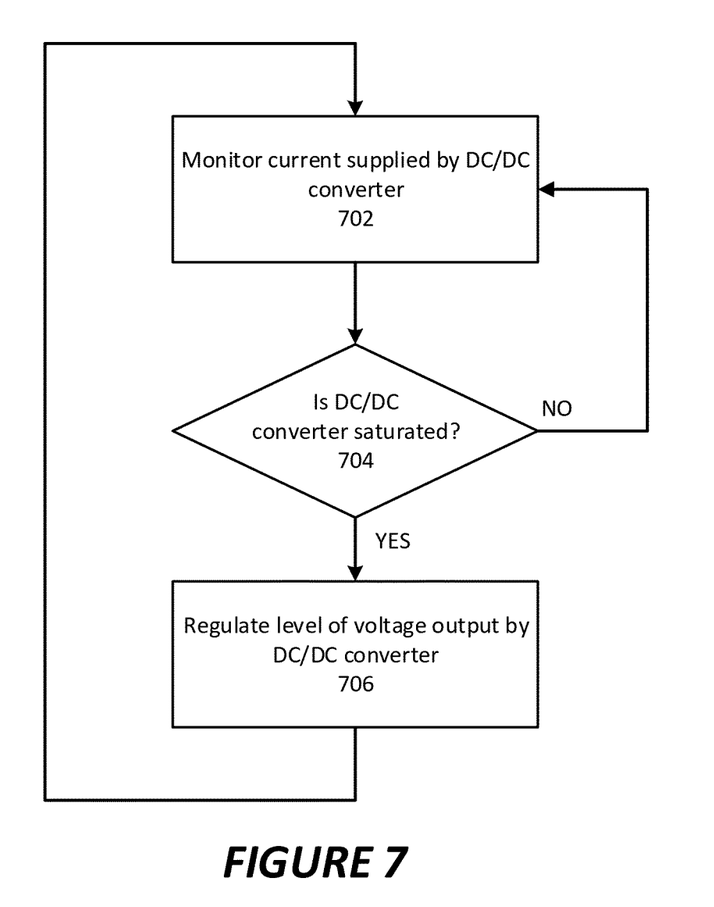
FIGS. 7 to 9 are flow diagrams illustrating operations of systems/methods according to some embodiments of the inventive concepts.

For example, referring to FIG. 7, operations of systems and/or methods according to some embodiments are illustrated. These operations may be implemented in various embodiments by an ECU 120 and/or a DC/DC converter 210 depending on the particular implementation used. In block 702, the systems/methods monitor the current supplied by the DC/DC converter 210. For example, the current output by one or more of the current and voltage regulation units 228 may be monitored at block 702. At block 704, the systems/methods determine if the DC/DC converter is at or near saturation. If not, operations return to block 702. However, if it is determined at block 704 that the DC/DC converter is at or near saturation, the systems/methods regulate a level of output voltage supplied by the DC/DC converter 210 at block 706. Following regulation of the level of the output voltage supplied by the DC/DC converter 210, operations return to block 702, where the systems/methods continue to monitor the current supplied by the DC/DC converter 210.

Regulation of the output voltage may be performed by modifying the switching frequency of the control signal Vctrl used in a voltage conversion circuit in the DC/DC converter 210 as described above. Regulation of the output voltage may be selectively performed on individual ones of the voltage and current adjustment units 228.

In some embodiments, upon detecting that the DC/DC converter 210 is at or near saturation, the ECU 120 may display an informational message to an operator of the vehicle requesting the operator to reduce 12-volt current draw by turning off one or more 12-volt devices on the vehicle. Other means of communication may be used besides the display 122, such as notifying the operator with an audible alert, by sending a message to the operator on a mobile application, etc.

In some embodiments, upon detecting that the DC/DC converter 210 is at or near saturation, the ECU 120 may automatically switch off or request shutdown of some 12V electrical loads in order to reduce 12V current consumption.

As shown in FIG. 5, the DC/DC converter 210 may power multiple independent 12-volt load circuits. In some embodiments, the ECU 120 may attempt to balance the 12V output power among the different load circuits by, for example, limiting one or more output current levels, adapting one or more output loads, and/or switching off one or more output loads on the independent 12-volt load circuits.

In some embodiments, the ECU 120 may switch off one or more of the voltage and current adjustment circuits 228 to reduce the total current output by the DC/DC converter to avoid saturation. The decision of which load circuit to adapt or switch off may be based on an assigned priority of the respective load circuits. For example, in some embodiments, each of the load circuits may be assigned a priority level. In the event that the ECU 120 determines that it is necessary to shut down one of the load circuits to avoid saturation, the ECU 120 may disable the voltage and current adjustment unit 228 associated with the 12-volt load circuit having the lowest priority among active 12-volt load circuits.

Figure 8:
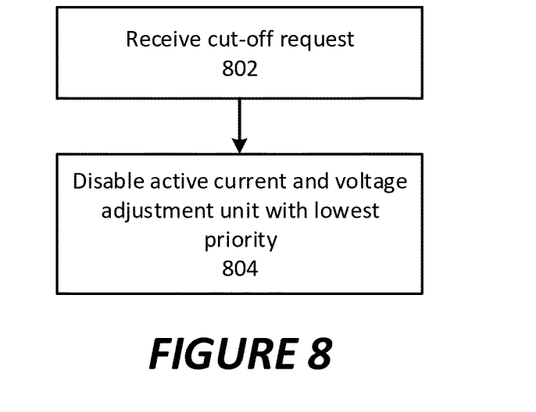

For example, FIG. 8 illustrates operations of systems and/or methods according to some embodiments. As shown therein, a DC/DC converter 210 receives a cut-off request from the ECU 120 (block 802). In response, the DC/DC converter disables the current and voltage adjustment unit 228 having the lowest priority among active current and voltage adjustment units (block 804).

Loads may be connected to a load circuit based on the importance of the load. For example, loads relating to operator safety may be connected to a load circuit with the highest priority, which may be the last load circuit to be switched off in the event of a saturation or overcurrent condition.

In some embodiments, the decision to switch off a load circuit by disabling the corresponding voltage and current adjustment unit 228 may be made based in part on a state of charge (SOC) of the battery system 200. For example, the SOC sensor 212 may report the SOC of the battery system 200 to the ECU 120, and the ECU 120 may control the 12V outputs of the DC/DC converter 210 based on the battery state of charge.

In some embodiments, a plurality of priority levels may be defined. Each of the current and voltage adjustment units 228 may have an associated priority level, and the ECU 120 may control the operation of the current and voltage adjustment units 228 in response to saturation and/or near saturation of the current and voltage adjustment units 228 based on the priority level and the reported SOC.

For example, in some embodiments, priority levels of 0 to 4 may be defined, and each of the current and voltage adjustment units 228 may be assigned a priority level. Each priority level may be associated with an importance associated with the loads supplied by the current and voltage adjustment units 228 based, for example, on safety and/or criticality of the loads. In some embodiments, in the event the ECU 120 detects a saturation condition, the ECU 120 may send a cut-off request having a request level to the DC/DC converter 210, where the request level is based on the SOC of the battery system 200. The DC/DC converter 210 may then disable one or more of the current and voltage adjustment units 228 based on the request level of the cut-off request. In this manner, the DC/DC converter 210 may be controlled to switch off the load circuits independently.

For example, in one implementation request levels may be assigned based on SOC as shown in Table 1, below.

TABLE 1

SOC and Cut-off Request Levels

| SOC (%) | Cut-off Request Level |
| --- | --- |
| 100 | 0 |
| 40 | 1 |
| 30 | 2 |
| 25 | 3 |
| 20 | 4 |
| 15 | 5 |

The DC/DC converter 210 may compare the request level of the cut-off request with the priority level of each of the current and voltage adjustment units 228, and disable any of the current and voltage adjustment units 228 that has a priority level less than the request level. For a cut-off request level of 0, the DC/DC converter 210 may take an action to reduce saturation other than by disabling one of the current and voltage adjustment units 228, such as by attempting to balance the current load, or by increasing voltage levels output by the current and voltage adjustment units 228, etc.

Figure 9:
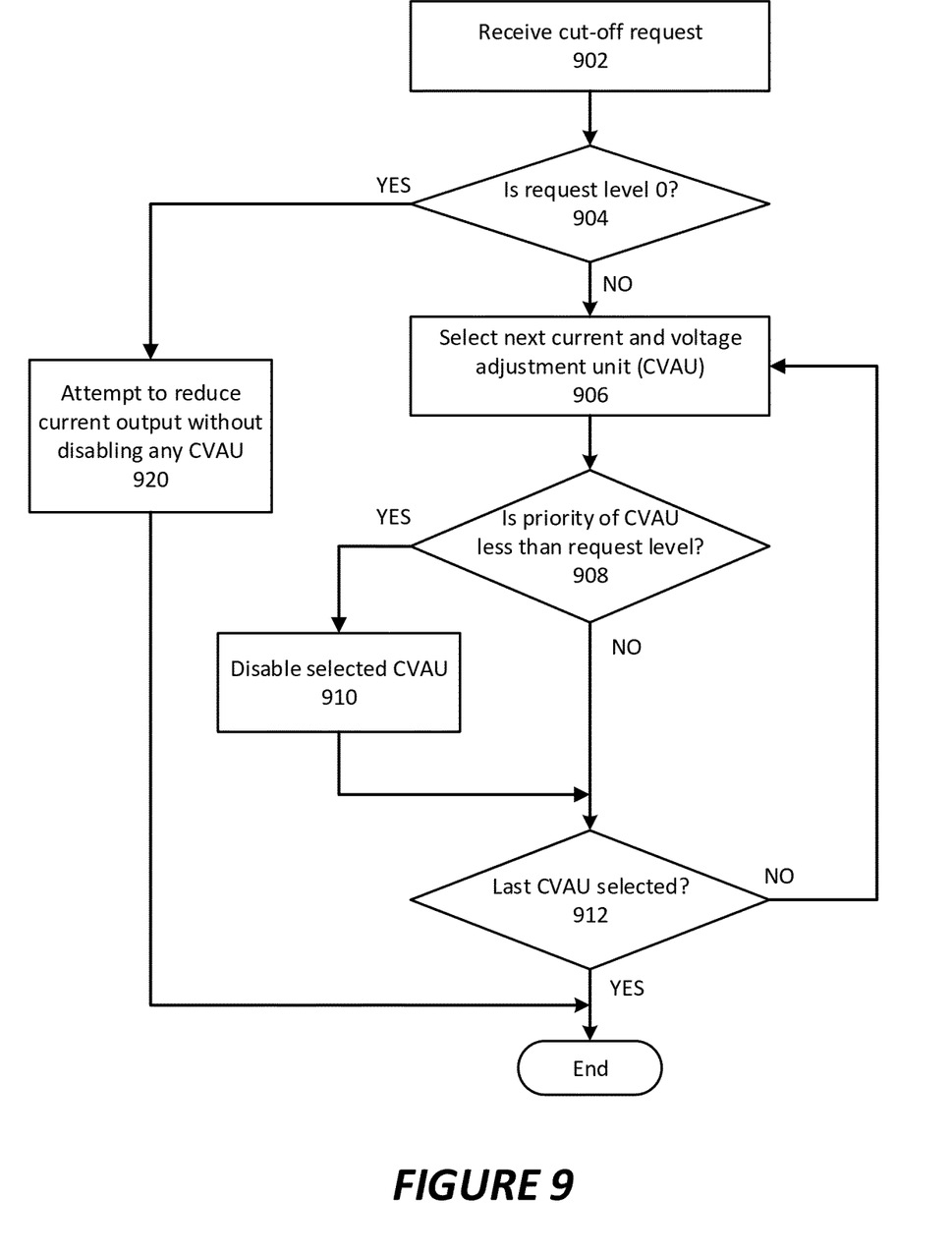

For example, FIG. 9 illustrates operations of a DC/DC converter 210 according to further embodiments. Referring to FIG. 9, a DC/DC converter 210 receives a cut-off request from an ECU at block 902. The DC/DC converter 210 first determines at block 904 if the cut-off request has a request level of 0, and if so, operations proceed to block 920, where the DC/DC converter 210 attempts to reduce current output without disabling any of the current and voltage adjustment units 228, such as by increasing the output voltage of one or more of the current and voltage adjustment units 228.

If the request level of the request is greater than 0, operations proceed to block 906, where the DC/DC converter 210 selects the next current and voltage adjustment unit 228, and then determines if the priority associated with the selected current and voltage adjustment unit 228 is less than the request level (block 908). If the priority associated with the selected current and voltage adjustment unit 228 is not less than the request level, operations proceed to block 912. However, if the priority associated with the selected current and voltage adjustment unit 228 is less than the request level, the DC/DC converter 210 disables the selected current and voltage adjustment unit 228 (block 910). The DC/DC converter 210 then determines at block 912 whether the selected current and voltage adjustment unit 228 was the last current and voltage adjustment unit 228, and if so, operations terminate. Otherwise, operations return to block 906 to select the next current and voltage adjustment unit 228.

By appropriate setting of cut-off request levels and priority levels of the current and voltage adjustment units 228, the DC/DC converter 210 may be configured to shut off non-essential functions when saturation occurs or before an overcurrent condition occurs but keep essential functions, such as safety or communication functions, operational even in the event of saturation.

In some embodiments, if one or more of the actions taken by the ECU 120 to alleviate a saturation condition is not effective, the ECU 120 may provide a critical alert to the vehicle operator for example, by displaying a message on the display 122 or by any other suitable means.

Various embodiments are described herein by way of non-limiting examples in the context of a dual voltage vehicle electrical system. It is to be understood that the embodiments are not limited to the particular configurations disclosed herein.

When an element is referred to as being "connected", "coupled", "responsive", "mounted", or variants thereof to another element, it can be directly connected, coupled, responsive, or mounted to the other element or intervening elements may be present. In contrast, when an element is referred to as being "directly connected", "directly coupled", "directly responsive", "directly mounted" or variants thereof to another element, there are no intervening elements present. Like numbers refer to like elements throughout. As used herein, the singular forms "a", "an" and "the" are intended to include the plural forms as well, unless the context clearly indicates otherwise. Well-known functions or constructions may not be described in detail for brevity and/or clarity. The term "and/or" and its abbreviation "/" include any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Persons skilled in the art will recognize that certain elements of the above-described embodiments may variously be combined or eliminated to create further embodiments, and such further embodiments fall within the scope and teachings of inventive concepts. It will also be apparent to those of ordinary skill in the art that the above-described embodiments may be combined in whole or in part to create additional embodiments within the scope and teachings of inventive concepts. Thus, although specific embodiments of, and examples for, inventive concepts are described herein for illustrative purposes, various equivalent modifications are possible within the scope of inventive concepts, as those skilled in the relevant art will recognize. Accordingly, the scope of inventive concepts is determined from the appended claims and equivalents thereof.

The invention claimed is:

1. A method of operating a vehicle electrical system including an electrical power source configured to supply a first DC voltage at a first voltage level and a DC/DC converter coupled to the electrical power source and configured to supply a second DC voltage at a second voltage level that is different from the first voltage level, the method comprising:
monitoring a level of current supplied by the DC/DC converter; determining, based on monitoring of the level of the current, that the DC/DC converter is saturated; and
in response to determining that the DC/DC converter is saturated, regulating a level of voltage output by the DC/DC converter;
wherein regulating the level of voltage output by the DC/DC converter comprises increasing a level of voltage output by the DC/DC converter to reduce a draw of current output by the DC/DC converter by a load connected to the DC/DC converter.

2. The method of claim 1, wherein monitoring the level of current supplied by the DC/DC converter comprises receiving a data signal from the DC/DC converter indicating the level of current supplied by the DC/DC converter.

3. The method of claim 2, wherein the data signal is provided via a Controller Area Network, CAN, or Local Interconnect Network, LIN, data bus.

4. The method of claim 1, wherein the data signal comprises a load percent indicator that indicates a percentage of power supplied by the DC/DC converter relative to a maximum power level.

5. The method of claim 1, wherein the DC/DC converter is configured to supply electrical power to a plurality of independent electrical loads, and wherein regulating the level of voltage output by the DC/DC converter comprises selectively regulating the level of voltage output by the DC/DC converter to the plurality of independent electrical loads.

6. The method of claim 5, wherein regulating the level of voltage output by the DC/DC converter comprises selectively disabling power supplied to one of the plurality of independent electrical loads.

7. The method of claim 5, further comprising: selectively regulating a level of current output by the DC/DC converter one of the plurality of independent electrical loads in response to determining that the DC/DC converter is saturated.

8. The method of claim 5, wherein the vehicle electrical system comprises a battery source, the method further comprising:
measuring a state of charge on the battery source;
wherein selectively disabling one of the plurality of independent electrical loads is performed based on the state of charge of the battery source.

9. The method of claim 8, wherein each of the plurality of independent electrical loads has an assigned priority level, and wherein selectively disabling one of the plurality of independent electrical loads is additionally performed based on a priority level assigned to the one of the plurality of independent electrical loads.

10. The method of claim 5, wherein selectively regulating the level of voltage output by the DC/DC converter to the plurality of independent electrical loads comprises balancing a level of power output to each of the plurality of independent electrical loads.

11. The method of claim 1, wherein regulating the level of voltage output by the DC/DC converter comprises transmitting a cut-off request to the DC/DC converter.

12. The method of claim 11, wherein the cut-off request comprises a priority level.

13. The method of claim 12, wherein the priority level is based on at least one of a state of charge, SOC, of a battery coupled to the DC/DC converter, a load function of a load that is being cut off and/or a severity of an overcurrent condition of the DC/DC converter.

14. A method of operating a DC/DC converter including a plurality of output lines coupled to respective load circuits, each of the plurality of output lines having a respective priority level, the method comprising:
receiving a cut-off request from an electrical control unit, wherein the cut-off request comprises a request level;
in response to receiving the cut-off request, attempting to reduce a level of current output by the DC/DC converter without disabling any of the output lines;
selecting one of the plurality of output lines;
determining if a priority level associated with the selected one of the plurality of output lines units is less than the request level; and
in response to determining that the priority level associated with the selected one of the plurality of output lines is less than the request level, disabling the selected one of the plurality of output lines.

15. The method of claim 14, further comprising:
after determining if a priority level associated with the selected one of the plurality of output lines is less than the request level:
selecting a next one of the plurality of output lines;
determining if a priority level associated with the selected next one of the plurality of output lines is less than the request level; and
in response to determining that the priority level associated with the selected next one of the plurality of output lines is less than the request level, disabling the selected next one of the plurality of output lines.

16. The method of claim 14, wherein the DC/DC converter includes a plurality of current and voltage adjustment units that generate a DC output voltage in response to a DC input voltage coupled to respective ones of the load circuits through respective ones of the plurality of output lines, wherein disabling the selected one of the plurality of output lines comprises disabling the current and voltage adjustment unit coupled to the selected one of the plurality of output lines.

17. The method of claim 14, wherein the DC/DC converter comprises a voltage conversion unit that generate a DC output voltage in response to a DC input voltage and a plurality of switches, wherein the voltage conversion unit is coupled to the plurality of output lines through respective ones of the plurality of switches, wherein disabling the selected one of the plurality of output lines comprises disconnecting the selected one of the plurality of output lines via the respective one of the plurality of switches coupled to the selected one of the plurality of output lines.

18. A vehicle electrical system, comprising
a DC voltage source configured to supply a first output voltage having a first output voltage level;
a DC/DC converter coupled to the DC voltage source and configured to supply a first output voltage having a second output voltage level that is different from the first output voltage level;
an electrical control unit coupled to the DC/DC converter and comprising a microcontroller programmed to perform operations including:
monitoring a level of current supplied by the DC/DC converter;
determining, based on monitoring of the level of the current, that the DC/DC converter is saturated; and
in response to determining that the DC/DC converter is saturated, regulating a level of voltage output by the DC/DC converter;
wherein regulating the level of voltage output by the DC/DC converter comprises increasing a level of voltage output by the DC/DC converter to reduce a draw of current output by the DC/DC converter by a load connected to the DC/DC converter.

19. A DC/DC converter for a vehicle electrical system, comprising:
a controller; and
a plurality of output lines coupled to the controller and configured to supply an output voltage to a respective one of a plurality of load circuits;
wherein the controller is configured to:
receive a cut-off request from an electrical control unit;
in response to receiving the cut-off request, attempting to reduce a level of current output by the DC/DC converter without disabling any of the output lines;
in response to the cut-off request, select one of the plurality of output lines having a lowest priority among the plurality of current and voltage adjustment units; and disable the selected one of the plurality of output lines.

20. A DC/DC converter for a vehicle electrical system, comprising
a controller; and
a plurality of output lines coupled to the controller and configured to supply an output voltage to a respective one of a plurality of load circuits;
wherein the controller is configured to:
receive a cut-off request from an electrical control unit, wherein the cut-off request comprises a request level;
in response to receiving the cut-off request, attempting to reduce a level of current output by the DC/DC converter without disabling any of the output lines;
select one of the plurality of output lines; determine if a priority level associated with the selected one of the plurality of output lines is less than the request level; and in response to determining that the priority level associated with the selected one of the plurality of output lines is less than the request level, disable the selected one of the plurality of output lines.

* * * * *